US012755017B2

(12) United States Patent
Germek et al.

(10) Patent No.: US 12,755,017 B2
(45) Date of Patent: Oct. 6, 2026

(54) SOFTWARE VERIFICATION DEVICE

(71) Applicant: Robert Bosch GmbH, Stuttgart (DE)

(72) Inventors: Dominik Germek, Berlin (DE); Maria Irina Nicolae, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 39 days.

(21) Appl. No.: 18/884,845

(22) Filed: Sep. 13, 2024

(65) Prior Publication Data

US 2025/0103717 A1 Mar. 27, 2025

(30) Foreign Application Priority Data

Sep. 21, 2023 (DE) ......................... 102023209241.7

(51) Int. Cl.
*G06F 21/56* (2013.01)

(52) U.S. Cl.
CPC ...... *G06F 21/566* (2013.01); *G06F 2221/032* (2013.01)

(58) Field of Classification Search
CPC ............. G06F 21/566; G06F 2221/032; G06F 21/562; G06F 21/56; G06F 2221/033; G06N 7/02
USPC ............................................................ 726/24
See application file for complete search history.

(56) References Cited

U.S. PATENT DOCUMENTS 10,185,595 B1 * 1/2019 Ramatchandirane ........................ H04L 9/3236
11,106,801 B1 * 8/2021 Levine ................ G06F 11/3692
11,734,418 B1 * 8/2023 Epstein ................... G06F 21/53 726/22
11,888,885 B1 * 1/2024 Long ..................... G06F 21/577
2005/0283751 A1 * 12/2005 Bassin ................... G06Q 10/04 717/100
2009/0089751 A1 * 4/2009 Raikes .................... G06F 9/453 717/120

(Continued)

OTHER PUBLICATIONS

Chen, Z., Rizkallah, C., O'Connor, L., Susarla, P., Klein, G., Heiser, G., & Keller, G. (Nov. 2022). Property-based testing: Climbing the stairway to verification. In Proceedings of the 15th ACM SIGPLAN International Conference on Software Language Engineering (pp. 84-97). (Year: 2022).*

(Continued)

*Primary Examiner* — Philip J Chea
*Assistant Examiner* — Dorianne Alvarado David
(74) *Attorney, Agent, or Firm* — Norton Rose Fulbright US LLP

(57) ABSTRACT

A software verification device. The device includes: a rule database having a plurality of rules, each rule containing a criterion regarding one or more software features and a software property, the rule stating that software that satisfies the criterion has the software property, an input interface configured to receive a specification (e.g., source code) of a software, and one or more processors configured to ascertain which of the software features the software has, and to ascertain, on the basis of which software features the software has been ascertained to have, which of the rules contain criteria that are satisfied, and to ascertain, according to the rules that contain criteria that are satisfied, which of the software properties the software has, and to ascertain whether the software properties that the software has been ascertained to have satisfy one or more predetermined requirements.

14 Claims, 2 Drawing Sheets

(56) References Cited

U.S. PATENT DOCUMENTS

| | | | | |
|---|---|---|---|---|
| 2011/0231828 | A1* | 9/2011 | Kaulgud | G06F 11/3616 717/131 |
| 2012/0180027 | A1* | 7/2012 | Yu | G06F 11/3698 717/126 |
| 2013/0145463 | A1* | 6/2013 | Ghosh | G06F 21/53 726/22 |
| 2014/0096184 | A1* | 4/2014 | Zaitsev | G06F 21/50 726/1 |
| 2018/0285080 | A1* | 10/2018 | Bharti | G06F 8/20 |
| 2020/0311260 | A1* | 10/2020 | Klonowski | G06F 9/45558 |
| 2021/0056209 | A1* | 2/2021 | Fox | G06F 21/563 |
| 2021/0200840 | A1* | 7/2021 | Kannan | G06F 8/73 |
| 2021/0319108 | A1* | 10/2021 | Segal | G06F 21/566 |
| 2023/0185692 | A1* | 6/2023 | Campbell | G06F 11/0751 717/110 |
| 2024/0419793 | A1* | 12/2024 | Stussi | G06F 21/563 |
| 2025/0005133 | A1* | 1/2025 | Goodman | G06F 21/575 |
| 2025/0005161 | A1* | 1/2025 | Ogura | G06F 21/572 |

OTHER PUBLICATIONS

Rajamani, S. K. (2006, September). Automatic property checking for software: past, present and future. In Fourth IEEE International Conference on Software Engineering and Formal Methods (SEFM'06) (pp. 18-20). IEEE. (Year: 2006).*

* cited by examiner

SOFTWARE VERIFICATION DEVICE

CROSS REFERENCE

The present invention relates to software verification devices.

BACKGROUND INFORMATION

For many software applications, software packages from third parties are used instead of writing all the program components oneself. An example of this is open source software packages that can be downloaded from various registries and integrated into one's own software application. However, this requires a more thorough review of the software, as third-party software may not meet the requirements expected of it. Effective approaches are therefore desirable to avoid using software that does not meet desired requirements.

SUMMARY

According to various embodiments of the present invention, a software verification device is provided, comprising: a rule database having a plurality of rules, each rule containing a criterion regarding one or more software features and a software property, the rule stating that software that satisfies the criterion has the software property, an input interface configured to receive a specification (e.g., source code) of a software; one or more processors configured

- to ascertain which of the software features the software has,
- to ascertain, on the basis of which software features the software has been ascertained to have, which of the rules contain criteria that are satisfied (by the software),
- to ascertain, according to the rules that contain criteria that are satisfied (by the software), which of the software properties the software has and
- to ascertain whether the software properties that the software has been ascertained to have satisfy one or more predetermined requirements; and
  - an output interface configured to enable use of the software by a data processing device (a data processing device other than that implementing the software security checking device or even the same data processing device that implements the software security checking device) if (i.e., e.g., in response to) it has been ascertained (by the one or more processors) that the software properties that the one or more processors ascertained the software to have satisfy the one or more predetermined requirements.

The software verification device described above enables the automatic extraction of properties, e.g., the behavior of a software (e.g., of an unknown software package) and ensures, for example, that a software is only enabled for use if necessary requirements are satisfied by the extracted properties. This can prevent the use of malicious software (or software that is harmful due to unsuitable properties).

Various exemplary embodiments of the present invention are specified below.

Exemplary embodiment 1 is a software verification device as described above.

Exemplary embodiment 2 is a software verification device according to exemplary embodiment 1, wherein for at least some (possibly all) of the rules the criterion is a Boolean function of the one or more software features.

This enables efficient modeling and testing of various software properties.

Exemplary embodiment 3 is a software verification device according to exemplary embodiment 1 or 2, wherein the one or more predetermined requirements comprise that the software properties which the software has been ascertained (by the one or more processors) to have are within a predetermined allowable set of software properties and/or that the software properties which the software has been ascertained (by the one or more processors) to have cover a predetermined set of required software properties.

This allows software with certain properties to be excluded (e.g., the property "malicious" is not permitted) and/or certain properties to be required (e.g., the property that a certain redundancy is present or that the software is of a certain type (e.g., "mathematical library")).

Exemplary embodiment 4 is a software verification device according to one of exemplary embodiments 1 to 3, wherein the software property is that the software is malicious and the one or more requirements include the requirement that the software is not malicious.

Ultimately, the software verification device works as a security detector in this case.

Exemplary embodiment 5 is a software verification device according to one of exemplary embodiments 1 to 4, wherein the rule database contains, for each software property of a plurality of software properties, at least one rule that contains the software property.

For example, it is possible to test for a plurality of software properties, i.e., to ascertain whether the software has them, which together result in a certain behavior, so that a behavior of the software can be ascertained and enabled depending on the ascertained behavior.

Exemplary embodiment 6 is a software verification device according to one of exemplary embodiments 1 to 5, wherein at least one software property is a software type.

In particular, it can be ascertained whether the software has a desired software type (e.g., library with functions for a specific application area, etc.).

Exemplary embodiment 7 is a software verification device according to one of exemplary embodiments 1 to 3, wherein at least some of the rules are fuzzy logic rules.

This allows rules to be defined more flexibly to capture specific software properties.

Exemplary embodiment 8 is a software verification device according to one of exemplary embodiments 1 to 7, comprising a user interface for defining at least some of the rules of the rule database.

This allows software to be automatically checked for certain properties based on rules defined by human users.

Exemplary embodiment 9 is a software verification device according to one of exemplary embodiments 1 to 8, wherein the data processing device is a control device and the software is at least a part of a control program for a robot device.

In this way, for example, the safety of a robot control system can be ensured.

Exemplary embodiment 10 is a method for verifying software, comprising storing a plurality of rules, each rule containing a criterion regarding one or more software features and a software property, the rule stating that software that satisfies the criterion has the software property, receiving a specification of a software, ascertaining which of the software features the software has, ascertaining, on the basis of which software features the software has been ascertained to have, which of the rules contain criteria that are satisfied (by the software), ascertaining, according to the rules that contain criteria that are satisfied, which of the software properties the software has, ascertaining whether the software properties the software has been ascertained to have satisfy one or more predetermined requirements, and enabling use of the software by a data processing device if it has been ascertained that the software properties that the software was ascertained to have satisfy the one or more predetermined requirements.

Exemplary embodiment 11 is a computer program comprising commands which, when executed by a processor, cause the processor to carry out a method according to exemplary embodiment 10.

Exemplary embodiment 12 is a computer-readable medium storing commands which, when executed by a processor, cause the processor to carry out a method according to exemplary embodiment 10.

It should be noted that exemplary embodiments described in connection with the software verification device of the present invention apply analogously to the method for verifying software of the present invention.

In the figures, similar reference signs generally refer to the same parts throughout the various views. The figures are not necessarily true to scale, with emphasis instead generally being placed on the representation of the principles of the present invention. In the following description, various aspects are described with reference to the figures.

DETAILED DESCRIPTION OF EXAMPLE EMBODIMENTS

The following detailed description relates to the accompanying drawings, which show, by way of explanation, specific details and aspects of this disclosure in which the present invention can be executed. Other aspects may be used and structural, logical, and electrical changes may be performed without departing from the scope of protection of the present invention. The various aspects of this disclosure are not necessarily mutually exclusive, since some aspects of this disclosure may be combined with one or more other aspects of this disclosure to form new aspects.

Various examples are described in more detail below.

Figure 1:
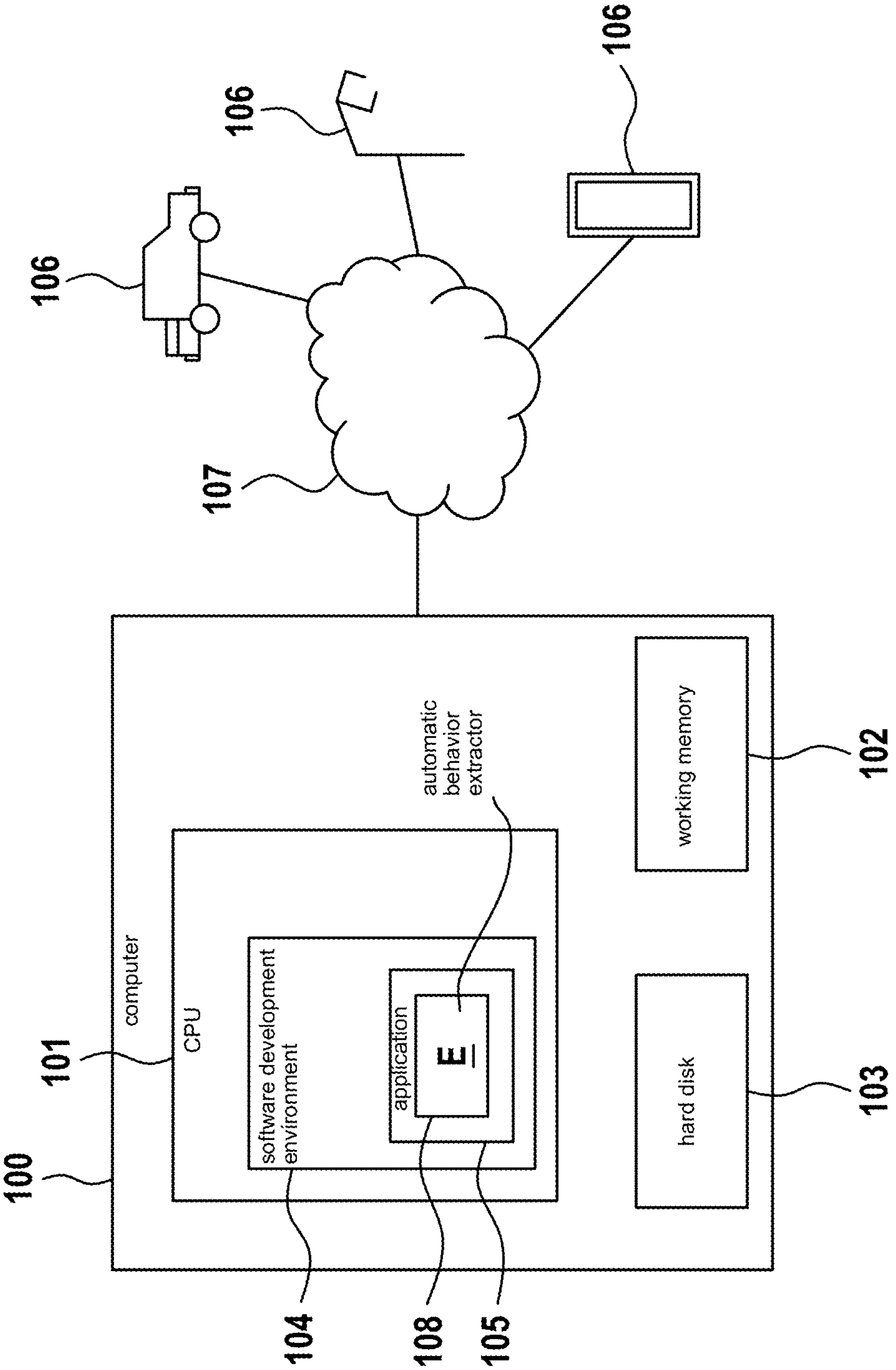
FIG. 1 shows a computer for developing and/or testing software applications, according to an example embodiment of the present invention.

FIG. 1 shows a computer 100 for developing and/or testing software applications.

The computer 100 comprises a CPU (central processing unit) 101 and a working memory (RAM) 102. The working memory 102 is used for loading program code, e.g., from a hard disk 103, and the CPU 101 executes the program code.

In the present example, it is assumed that a user (developer) intends to develop and/or test a software application using the computer 100.

For this purpose, the user runs a software development environment 104 in the CPU 101.

The software development environment 104 makes it possible for the user to develop and test an application (i.e. software) 105 for different devices 106, i.e. target hardware, such as embedded systems for controlling robot devices, including robot arms and autonomous vehicles, or also for mobile (communication) devices. For this purpose, the CPU 101 can run an emulator as part of the software development environment 104 in order to simulate the behavior of the particular device 106 for which an application is being or has been developed. If it is used only for testing software from another source, the software development environment 104 can also be regarded as or configured as a software testing environment (and thus the computer can also be regarded or configured in particular as a software verification device).

The user can distribute the finished application to corresponding devices 106 via a communication network 107. Rather than via a communication network 107, this can also be done in another way, for example by means of a USB stick.

Before doing so, however, the user should perform a verification for the application 105, i.e., gain knowledge about whether the application 105 has certain properties, such as that it is not malicious, in order to avoid distributing a malfunctioning application to the devices 106. This may also be the case if the user has not written at least part of the application 105 himself, but rather has for example incorporated program components from third-party providers, e.g., libraries, in particular from open source software packages.

Open source software packages have become an essential cornerstone of modern software development. It is estimated that free and open source software accounts for 70 to 90% of any modern software solution. The availability of software packages therefore influences almost every aspect of modern software-based solutions, products, and services. Numerous packages can be downloaded from one of the many software package registries (also called repositories), including npm (JavaScript), PyPI (Python), RubyGems (Ruby), and others. Distributed across these registries, developers publish tens of thousands of updates and upload hundreds of new packages every day, creating a collection of several million openly available software packages. Unfortunately, this overwhelming availability of free software comes at a price: potentially malicious or harmful software. The increased risk is due to a plurality of factors: (1) anyone can upload software packages, (2) only a limited number of packages are digitally signed or verified, and (3) registries typically do not have an active detection mechanism. This environment is ideal for the integration of manipulated software packages in order to carry out attacks, e.g., on a supply chain.

According to various embodiments, an approach is provided that allows for an unknown software package (i.e., one or more programs that could be part of a larger program, such as one or more program components of the application 105) to automatically extract a behavior description (i.e., properties of the software) from the software package or to ensure that the program(s) contained in the software package has desired properties (such as being benign). For example, the software development environment 104 implements a corresponding tool 108 (which can be considered a verification tool) that implements the approach described below.

According to various embodiments, the automatic extraction of a behavior description for a software package (or the verification based thereon that the program(s) contained in the software package has/have desired properties) is carried out on the basis of an automatic behavior extractor E (e.g., as part of the verification tool 108), which serves to automatically create a behavior description of a software package p (or any software). It should be noted that the term "software package" is not limited to software components from online registers. In principle, any snippet of code or any piece of software can be used as input for the extraction.

Figure 2:
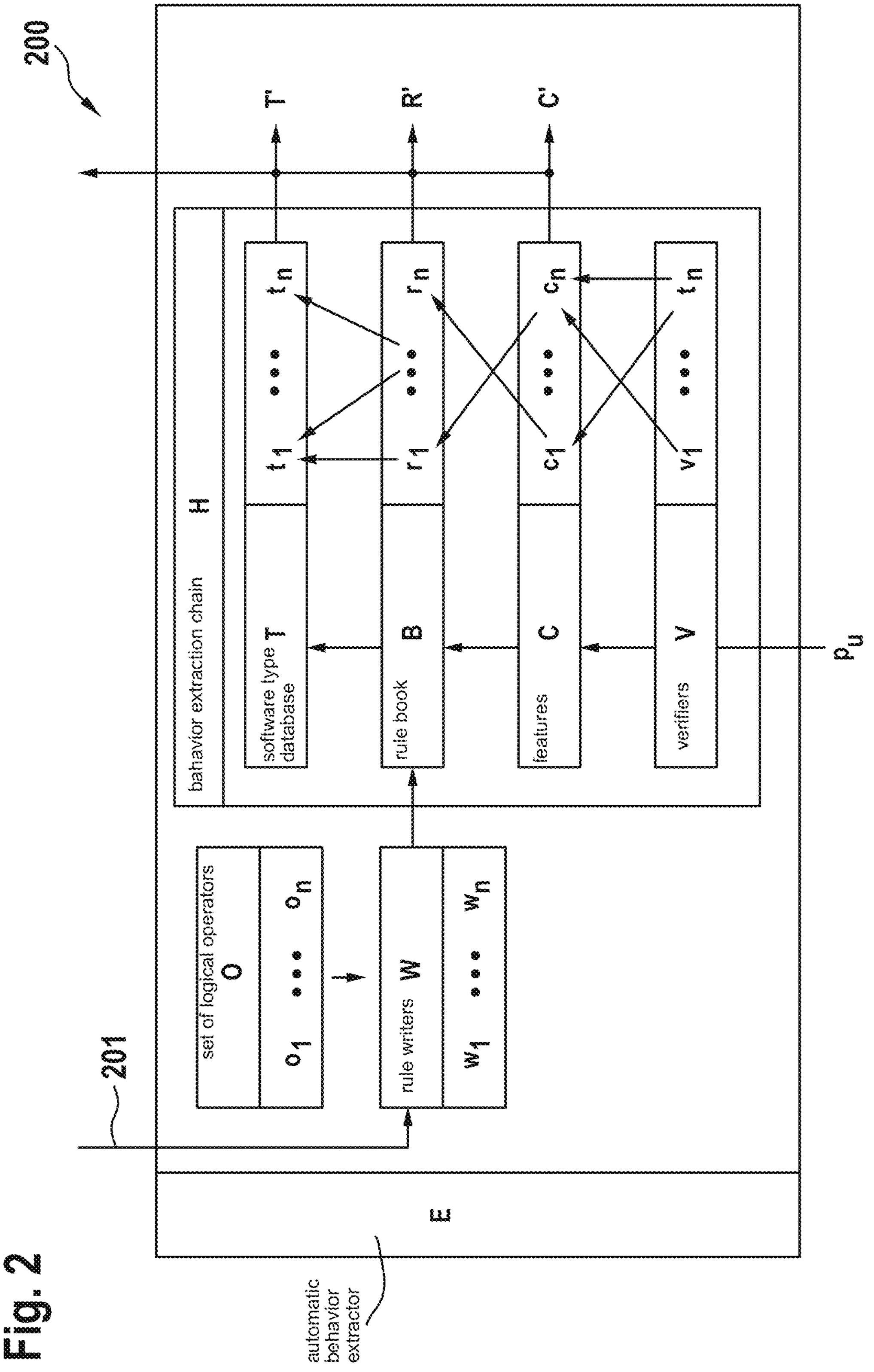
FIG. 2 illustrates the description of the architecture of an automatic behavior extractor according to an example embodiment of the present invention.

FIG. 2 illustrates the description of the architecture 200 of an automatic behavior extractor E according to an embodiment.

In this example, the properties for which a software package (i.e., software) is checked are whether the software package is benign or malicious and what type of software it is.

The input for E is an unknown software package $p_u$. "Unknown" may refer to a piece of software for which the user (e.g., of the computer 100) wants to check what behavioral characteristics are present in the code. The behavior extractor E contains a behavior extraction chain H. H contains four interconnected databases:

Feature database: This stores features C. The features define a set of individual properties that indicate certain characteristics (e.g., potentially malicious behavior, a certain type of software, etc.).

Verifier database: This contains information about verifiers V, that is, about a collection of tools, methods and systems that make it possible to check, for each of the features C, whether a given software package has this feature.

Rule book (rule database) B: This contains a set of rules, where each rule contains a criterion (e.g., in the form of a Boolean function with the features as input variables). Each rule is further associated with a property (in this example, "malicious" behavior) and states that the software has the property if the criterion of the rule (i.e., the criterion it contains) is satisfied.

Software types database (T): Contains known types of software, where each software type is associated with one or more rules from the rule book.

The rule book, in this example, stores a set of rules that define a particular behavior that can be associated with a particular type of software package, in this example benign/malicious: a single rule defines what a human (or any form of inference-generating model) defines as malicious behavior. The set of rules can be extended at any time by the rule writers W. For example, a user can write a new rule when necessary and enter it via a user interface, symbolized by the arrow 201 in FIG. 2. A rule writer can be a (human) user, a machine learning-based model, or any other process that can create appropriate rules. The rules can be adjusted based on the generated indices in order to better capture the verification of malicious behavior. Rules contain two main elements: features and operators. A feature describes e.g., a specific function of a software package, such as "establishes a connection to an external server," "processes passwords," "stores data," and others. Each feature can be checked (verified) by one or more of the verifiers. It should be noted that the individual features alone are not necessarily indicators of malicious behavior. However, using the logical operators O, rules can be formed that make it possible to model malicious behavior together with individual harmless features. For example, some features (possibly in combinations) are characteristic of malicious software only for a certain type of software. A corresponding rule can then be set up that combines these features (e.g., in combination) together with features that are characteristic of the software type in their combination (i.e., the rule is, for example, an AND operation of both combinations, so that the software is detected as malicious only if the features that indicate the maliciousness for the software type are satisfied and the features that indicate the software type are also satisfied, but other linking operators can also be used such as OR, NOT, etc.). As stated above, individual rules can also be associated with certain software types (i.e., the criterion that the rule contains is satisfied if the software type is present) so that the software type can be detected (i.e., such a rule contains the combination of features that indicates the software type only when the criterion that it contains is satisfied).

For example, a mathematical library should, with very high probability, not connect to an external server during a calculation. However, for an authentication package that communicates with an external service, connecting to an external server can be completely harmless behavior. The approach described thus makes it possible to translate a description of malicious behavior understandable to humans into rules that can be evaluated.

For example, as illustrated in FIG. 2, behavior extraction is performed as follows:

1. All available verifiers V in the behavior extraction chain (H) are carried out for $p_u$.
2. The dependencies on feature database C are tracked only for verifiers that have submitted a positive ("true") evaluation. All features referenced in this way, i.e., the set of all features C' for which the corresponding verifier has ascertained that $p_u$ has the feature, are stored separately for evaluation.
3. In the next step, the dependency chain is traversed all the way to the rule book, i.e., only the rules from the rule book that contain only referenced features, i.e., features from the set C', are selected and executed (i.e., evaluated to see whether their criteria are satisfied or not), and the rules whose criteria are satisfied are stored in a set R' for evaluation.
4. Finally, all software types are extracted from the software types database that are (in each case) associated with at least one rule whose criterion is satisfied (and is thus included in R'). These extracted software types are stored as a set T' for evaluation.
5. An evaluation is made based on C', R', and T'. This can be an enable signal that indicates that the software package has desired properties (i.e., a positive verification result), a signal that indicates that the software package does not have at least one desired property (and thus enabling is refused and, for example, a use and/or distribution of software containing the software package is refused), or a report is created that indicates the behavioral properties of the input package $p_u$.

The software type database T can be filled with available software types as follows:

One or more possible types can be manually extracted from the online description, keywords, documentation and other content available in the corresponding registry (e.g., on the specific package website on npm).

One or more possible types can be extracted from software packages using scripts that automatically search the named content of the software packages.

One or more possible types can be extracted using machine learning-based content analysis of software packages.

The type can be defined manually (by the user) based on assumptions about the functionality (e.g., if the user intends to use a mathematical library, the type "mathematical library" can be included in T because it is plausible that this type is present; nevertheless, the rules can be used to check whether the type is actually present).

Examples of types are "mathematical library," "image rendering library," "crypto library," "machine learning library," "database," and others.

According to one embodiment, if the set of logical operators O used by the behavior extractor E is too rigid for some rules, the behavior extractor E can support fuzzy logic in order to express more "fuzzy" conditions. In terms of rules, this would mean including qualifiers for a particular behavior, such as "often," "slow," "moderate," "high." For example, instead of saying that p is malicious if r="connects to external server" is true (in this example, the criterion of the rule has only one feature, but it could be an AND combination of a plurality of features), one could define r="connects to external server VERY OFTEN." With the help of fuzzy logic, the approach described here can be adapted so that certain malicious or benign behavior (possibly specific to each software type, e.g., as expressed above with corresponding features in the rules) can be better detected and described.

In summary, according to various embodiments, a software verification device is provided (e.g., in the form of a data processing device such as the data processing device 100 or a component thereof) comprising:

A rule database having a plurality of rules, each rule containing a criterion regarding one or more software features and a software property, the rule stating that software that satisfies the criterion has the software property, an input interface configured to receive a specification (e.g., source code) of a software; one or more processors configured

- to ascertain which of the software features the software has,
- to ascertain, on the basis of which software features the software has been ascertained to have, which of the rules contain criteria that are satisfied,
- to ascertain, according to the rules that contain criteria that are satisfied, which of the software properties the software has, and
- to ascertain whether the software properties that the software has been ascertained to have satisfy one or more predetermined requirements; and an output interface (e.g., an interface to the network 107) configured to enable the use of the software by a data processing device (a data processing device other than that implementing the software security checking device or even the same data processing device that implements the software security checking device) if (i.e., e.g., in response to) it has been ascertained (by the one or more processors) that the software properties that the one or more processors ascertained the software to have satisfy the one or more predetermined requirements.

The software verification device can be carried out by one or more computers with one or more data processing units. The term "data processing unit" may be understood as any type of entity that allows for processing of data or signals. The data or signals can be treated, for example, according to at least one (i.e., one or more than one) special function which is performed by the data processing unit. A data processing unit can comprise or be formed from an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA) or any combination thereof. Any other way of implementing the respective functions described in more detail herein may also be understood as a data processing unit or logic circuit assembly. One or more of the method steps described in detail here can be executed (e.g., implemented) by a data processing unit by one or more special functions that are performed by the data processing unit.

According to various embodiments, the provided approach (or the software verification device) has or enables the following properties:

1. The production of a behavior description report (e.g., by the automatic behavior extractor E), based on a set of well-defined features and rules that can be understood by humans. The reports produced therefore provide extremely reliable and understandable descriptions that can be used for various purposes:
   - analysis of potentially malicious/benign behavior for software of unknown type(s). The generated reports can indicate which verifiers, features, and rules are "true" for the given software.
   - The generated reports can be used to check whether certain requirements are actually implemented in the software. The software verification device is therefore not limited to applications for detecting malicious/benign software.
   - The software verification device can also be used as a kind of software type classifier. For example, the general software type can be determined based on the verifiers, features, and rules triggered.
2. The different databases within the behavior chain offer a high degree of adaptability and flexibility in defining new rules. For example, a comprehensive rule can be created by nesting existing rules from the database.
3. The software verification device can be configured so that the number of registered verifiers, features, rules, and types in H increases with each use (as the software verification device adds them to the relevant databases), so that it becomes more and more efficient over time.
4. Once H is populated with data, the behavior extractor E can be integrated into an automated development environment (such as the software development environment 104). For example, the analysis can be triggered automatically during testing and create a report on the behavior. The report can then be used as input for various security checks.
5. The software verification device is applicable to both open source and closed source software.
6. The software verification device can support the analysis of any software code written in any programming language, as long as the verifiers support the target language.
7. The software verification device can support fuzzy logic to enable a more accurate description of software properties (e.g., malicious and benign behavior or software types) of software packages.

The software being verified (or the application that includes the software as a component) can, for example, be a control program or a control program component for a robot device. The term "robot device" can be understood to refer to any technical system (comprising a mechanical part whose movement is controlled and which therefore has a trajectory), such as a computer-controlled machine, a vehicle, a household appliance, a power tool, a manufacturing machine, a personal assistant, or an access control system. The software may also be part of an infotainment system in a vehicle or a software app on a mobile phone that communicates with another device (e.g., a robot device such as a vehicle or a robot).

The invention claimed is:

1. A software verification device, comprising:

a rule database having a plurality of rules, each rule containing a criterion defined as a logical function of one or more of a plurality of software features and being associated with a respective software property, the rule stating that software that satisfies the criterion has the software property;

an input interface configured to receive a specification of a software package;

an output interface;

one or more processors that are configured to:

execute a plurality of feature-specific verifiers selected from a verifier database, each verifier being configured to determine whether the software package exhibits a respective software feature;

identify, based on the execution, a subset of the plurality of software features that the software package has been ascertained to exhibit;

select, from the rule database, only those rules whose criteria reference exclusively software features included in the identified subset of software features;

execute the selected rules to determine which software properties are satisfied by the software package;

ascertain, based on execution of the selected rules whose criteria are satisfied, which of the software properties are present in the software package;

generate, based on the ascertained software properties, a behavior description of the software package that indicates the software properties determined to be present;

ascertain whether the software properties indicated by the generated behavior description to be present in the software package satisfy one or more predetermined requirements; and execute a software package gating operation that, using the output interface;

enables use of the software package by a data processing device when it has been ascertained that indicated by the generated behavior description to be present in the software package satisfy the one or more predetermined requirements; and prevent the use of the software package by the data processing device when the one or more predetermined requirements are not satisfied.

2. The software verification device according to claim 1, wherein for at least some of the rules, the criterion is a Boolean function of the one or more of the plurality of software features.

3. The software verification device according to claim 1, wherein the one or more predetermined requirements include: (i) that the software properties indicated by the generated behavior description to be present are within a predetermined allowable set of software properties, and/or (ii) that the software properties indicated by the generated behavior description to be present cover a predetermined set of required software properties.

4. The software verification device according to claim 2, wherein one of the software properties is that the software is malicious and the one or more requirements include a requirement that the software is not malicious.

5. The software verification device according to claim 2, wherein the rule database contains, for each of the software properties, at least one rule associated with the respective software property.

6. The software verification device according to claim 2, wherein at least one of the software properties is a software type.

7. The software verification device according to claim 2, wherein at least some of the rules are fuzzy logic rules.

8. The software verification device according to claim 2, further comprising a user interface for defining at least some of the rules of the rule database.

9. The software verification device according to claim 2, wherein the data processing device is a control device and the software package is at least a part of a control program for a robot device.

10. A method for verifying software, comprising the following steps:

storing, in a rule database, a plurality of rules, each rule containing a criterion defined as a logical function of one or more of a plurality of software features and being associated with a respective software property, the rule stating that software that satisfies the criterion has the software property;

receiving, by at least one processor, a specification of a software package;

executing, by the at least one processor, a plurality of feature-specific verifiers selected from a verifier database, each verifier being configured to determine whether the software package exhibits a respective software feature;

identifying, based on the execution, a subset of the plurality of software features that the software package has been ascertained to exhibit;

selecting, from the rule database, only those rules whose criteria reference exclusively software features included in the identified subset of software features;

executing the selected rules to determine which software properties are satisfied by the software package;

ascertaining, based on execution of the selected rules whose criteria are satisfied, which of the software properties are present in the software package;

generating, based on the ascertained software properties, a behavior description of the software package that indicates the software properties determined to be present;

ascertaining whether the software properties indicated by the generated behavior description to be present in the software package satisfy one or more predetermined requirements; and executing a software package gating operation that:

enables use of the software package by a data processing device when it has been ascertained that the software properties that indicated by the generated behavior description to be present in the software package satisfy the one or more predetermined requirements; and prevents the use of the software package by the data processing device when the one or more predetermined requirements are not satisfied.

11. A non-transitory computer-readable medium on which are stored commands for verifying software, the commands, when executed by a processor, causing the processor to perform the following steps:

storing, in a rule database, a plurality of rules, each rule containing a criterion defined as a logical function of one or more of a plurality of software features and being associated with a respective software property, the rule stating that software that satisfies the criterion has the software property;

receiving, by at least one processor, a specification of a software package;

executing, by the at least one processor, a plurality of feature-specific verifiers selected from a verifier database, each verifier being configured to determine whether the software package exhibits a respective software feature;

identifying, based on the execution, a subset of the plurality of software features that the software package has been ascertained to exhibit;

selecting, from the rule database, only those rules whose criteria reference exclusively software features included in the identified subset of software features;

executing the selected rules to determine which software properties are satisfied by the software package;

ascertaining, based on execution of the selected rules whose criteria are satisfied, which of the software properties are present in the software package;

generating, based on the ascertained software properties, a behavior description of the software package that indicates the software properties determined to be present;

ascertaining whether the software properties indicated by the generated behavior description to be present in the software package satisfy one or more predetermined requirements; and executing a software package gating operation that:

enables use of the software package by a data processing device when it has been ascertained that the software properties that indicated by the generated behavior description to be present in the software package satisfy the one or more predetermined requirements; and prevents the use of the software package by the data processing device when the one or more predetermined requirements are not satisfied.

12. The method of claim 10, wherein:

the rule database, the verifier database, and at least one additional database together form a behavior extraction chain, the behavior extraction chain comprising:

(a) a feature database storing the plurality of software features, each software feature defining a respective software package characteristic;

(b) the verifier database storing, for respective ones of the software features, information identifying one or more corresponding verifiers, each corresponding verifier being configured to determine whether the software package exhibits the respective software feature;

(c) the rule database storing the plurality of rules, each rule including a criterion defined as a function of one or more software features and one or more logical operators and being associated with the respective software property; and (d) a software types database storing a plurality of software types, each software type being associated with one or more rules from the rule database;

identifying the subset of the plurality of software features comprises storing, as a verified feature subset, those software features for which corresponding feature-specific verifiers produced positive verification results;

selecting, from the rule database, only those rules whose criteria reference exclusively software features included in the identified subset comprises traversing a dependency relationship between the verified feature subset and the rules;

executing the selected rules further comprises identifying a subset of rules whose criteria are satisfied and storing the identified subset of rules;

the method further comprises identifying, from the software types database, one or more software types associated with at least one rule of the identified subset of rules and storing the identified software types as an extracted software type subset;

generating the behavior description further comprises generating a report that indicates:

(i) which feature-specific verifiers produced positive verification results;

(ii) which software features are included in the identified subset of software features;

(iii) which rules of the selected rules were satisfied; and/or (iv) which software types were identified as associated with the satisfied rules;

the software package gating operation comprises generating at least one of an enable signal or a refusal signal based on whether the software properties indicated by the behavior description satisfy the one or more predetermined requirements;

at least some of the rules comprise Boolean rules and/or fuzzy logic rules; and at least some of the rules are definable or updatable via a machine-learning-based model.

13. The method of claim 10, further comprising determining one or more software types of the software package based on the subset of rules whose criteria are satisfied, wherein the one or more predetermined requirements include requirements dependent on the determined one or more software types.

14. The method of claim 13, wherein at least one of the rules defines a software property based on a combination of (i) one or more software features and (ii) a software type, such that the same software feature is indicative of different software properties depending on the software type.

* * * * *